Aug. 15, 1950     M. T. MAGUIRE     2,518,481
DRIVE FOR AMPHIBIAN TRACTORS
Filed May 12, 1945

WITNESSES:

INVENTOR
MICHAEL T. MAGUIRE.
BY
his ATTORNEY

Patented Aug. 15, 1950

2,518,481

UNITED STATES PATENT OFFICE 2,518,481

DRIVE FOR AMPHIBIAN TRACTORS

Michael T. Maguire, Baltimore, Md., assignor to Koppers Company, Inc., Pittsburgh, Pa., a corporation of Delaware Application May 12, 1945, Serial No. 593,397

2 Claims. (Cl. 180—9.1)

This invention relates to flexible couplings for driving shafts. More particularly the invention relates to flexible couplings for driving shafts of tractors which are subjected to heavy duty and rough service.

Tractors are generally moved by moving tracks. The tracks are usually driven by sprockets which are mounted at the front and rear of the tractor. The mounting of the shafts for driving the sprockets requires the use of flexible couplings to provide for the movement of the track over the rough terrain. The tracks for locomotion of tanks for war purposes have a similar construction and mounting for those of the tractor. The rough surface and heavy duty put on tanks and tractors has required the use of heavy couplings on the drive shafts to stand up under the strain.

Recently tractors have been developed which will operate on land, through swamps, or on the water. It is a very great advantage to such amphibian tractors that the parts should be strong, but still have very light weight. The light weight gives a very great advantage for the operation and use of the tractor in the water.

The primary object of the present invention is to provide a durable but light weight flexible shaft coupling.

Another object of the invention is to provide a light weight flexible shaft coupling which may be effectively used with a self-aligning bearing for a drive sprocket of a tractor track.

With these and other objects in view, the invention consists in the flexible coupling hereinafter described and particularly defined in the claims.

The various features of the invention are illustrated in the accompanying drawings in which.

Figure 2:
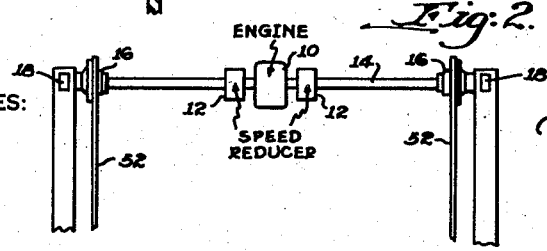
Figure 2 is a diagrammatic view illustrating the mounting of the flexible coupling on the drive shaft on a tractor.

In the diagrammatic view of Figure 2 is illustrated the mounting of the driving mechanism for the front end of a tractor. The driving mechanism consists of an engine 10 with speed reducing gear mechanism 12 mounted at each side of the engine and shafts 14 extending between the speed reducing gears and couplings 16 which drive track sprockets 18.

Figure 1:
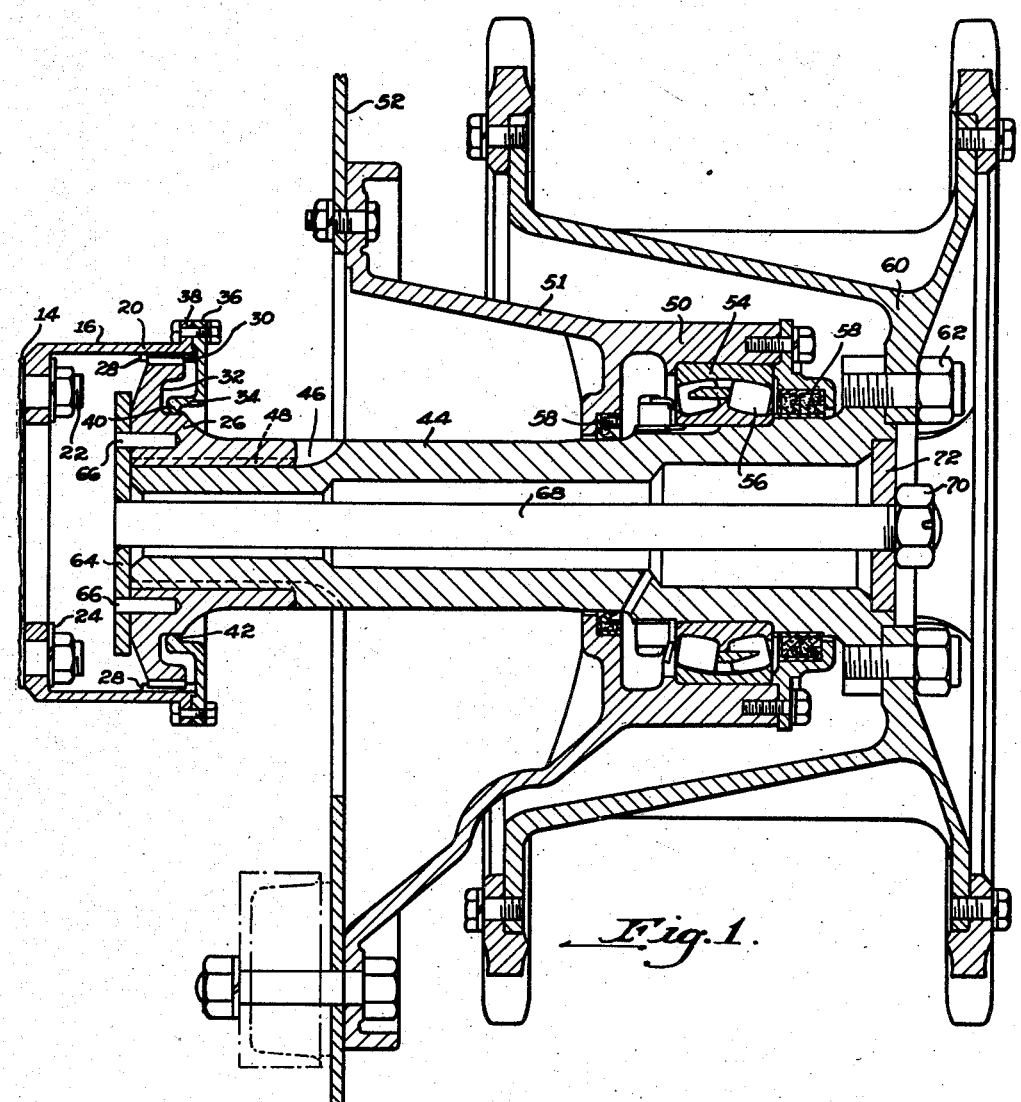
Figure 1 is a vertical sectional view showing the application of the improved flexible coupling as applied to the drive shaft or a tractor track sprocket.

The construction of the coupling 16 is shown more particularly in Figure 1 and consists of a cup 20 which is secured to the outer end of a shaft 14 by means of a series of cap screws 22. The cap screws are threaded into openings in the ends of the shaft 14 and are held in locked position with lock washers 24. The cap screws are located on the inside of the cup 20 and must be inserted when a coupling member 26 forming part of the flexible coupling is removed from the coupling.

Near the outer rim of the cup 20 is positioned a series of driving teeth 28 which are formed on the inside of the cup. The coupling member 26 is provided with a set of teeth 30 which mesh with the teeth 28 and thus the coupling member is driven in unison with the cup 20 when the shaft 14 is rotated. The portion of the coupling member 26 which is provided with the teeth 30 extends within the cup and immediately below the teeth 30 a groove 32 is formed in the coupling member 26 which is arranged to receive an inwardly extending flange 34 of a bearing ring 36 which is bolted to an outwardly extending flange 38 at the rim of the cup 20. The flange of the bearing ring has a rounded head 40 which is arranged to bear against a seat 42 formed within the groove 32 in the coupling member.

The cup 20 is preferably provided with an oil hole (not shown) so that oil may be introduced into the cup and thereafter is maintained in the cup for the purpose of fully lubricating the teeth 28 and 30. The teeth do not tightly mesh so that the cup 20 may move relatively to the coupling member 26 to provide for misalignment of the shafts to which the coupling members are attached and thus provide a flexible coupling for the shafts which will take care of the misalignment. As the cup and member move relatively to one another to provide for offset, or angular, or a combination of offset and angular misalignment, the rounded head 40 on the bearing ring maintains a close and tight contact with the bearing face of the alignment member so that the interior of the coupling is always closed to prevent the escape of lubricant from the coupling. The position of the rounded head 40 is such that the relative movement of the coupling member and cup merely moves the rounded head 40 across the bearing surface 42 parallel to the axis of the coupling member. The function of the bearing ring 36 is merely to maintain an oil and dust seal and therefore can be made of light metal such as aluminum.

The coupling member 26 is fixed on the inner end of an aligning shaft 44 by means of a series of splines 46 which receives keyways 48 formed in the coupling member. The outer end of the aligning shaft 44 is supported in a bearing 50 which is mounted in a holder 51 which bearing is secured to a frame 52 of the tractor. The bearing 50 is a ball and socket bearing having a socket 54 and roller bearings 56 arranged in arcuate position to cooperate with the arcuate surface of the socket 54. In the bearing frame 51 at each side of the bearing 54–56 are mounted gaskets 58 to make the bearing dust-proof and to hold lubricant within the bearing. A driving sprocket 60 is secured to the outer end of the aligning shaft 44 by means of cap screws 62. The arrangement of the ball and socket bearing in conjunction with the flexible coupling allows the aligning shaft 44 to adjust itself in position for driving the sprocket without putting undue strain on the shaft for misalignment of the driving shaft or misalignment of the bearing. This construction will permit the tractor track which is operated by the sprocket 60 to travel over rough terrain and still provide for the necessary angular adjustments of the driving shaft.

To permit the flexible coupling 16, aligning shaft 44 and bearing frame 51 to be easily assembled, it is desirable that these parts may be disconnected from the outside and removed separately. As explained above, the bearing frame 51 is removably mounted on the tractor frame 52. The coupling member 26 is detachably mounted on the inner end of shaft 44 by spline and keyway joint and the sprocket 60 is detachably mounted on the outer end of the shaft 44. To hold the shaft and coupling member together a plate 64 is located within the cup 20 and has a pair of pins 66 which project into openings in the coupling member 26. To align it in position in the coupling member a bolt 68 is secured to the plate 64 and extends through the shaft 44 with its outer end provided with a thread and nut 70 by which a washer 72 mounted in the end of the shaft 44 may be securely held in place to securely hold the coupling member on the inner end of the shaft 44.

With the coupling construction illustrated and described above it is possible to make the flexible coupling members, particularly the cup 20 and ring 34, out of carbon or alloy steels which have sufficient strength and still are comparatively light in weight. This construction provides a strong coupling member with a minimum amount of weight. The bearing ring can be made out of light weight metal such as aluminum.

The preferred form of the invention having been thus described, what is claimed as new is:

1. In combination, a body having a bracket detachably secured thereto, a bearing supported by said bracket, a hollow shaft extending through and supported by said bearing so that the first end of said shaft is accessible from the exterior of said body and the second end of said shaft is accessible from the interior of said body, a self-aligning coupling comprising a first member having internal teeth thereon and a second member having external teeth thereon which mesh with the teeth on the first member, one of said coupling members being mounted on the second end of said shaft by a splined connection so as to be movable axially thereof and to be substantially rigid rotatably thereof, and means comprising a member located within said hollow shaft and accessible from the first end of said shaft for detachably securing said shaft and the coupling member against axial movement relative to each other.

2. In combination, a body having a supporting bracket detachably secured thereto so as to be removable therefrom externally of said body, a bearing supported by said bracket, a hollow shaft extending through and rotatably supported by said bearing in such manner that the first end of said shaft is accessible from the exterior of said body and of said bracket and the second end of said shaft is accessible from the interior of said body and of said bracket, a self-aligning coupling comprising a first member having internal teeth thereon and a second member having external teeth thereon which mesh with the teeth on the first member, one of said coupling members being mounted on the second end of said shaft by a splined connection so as to be movable axially thereof and to be substantially rigid rotatably thereof, a first radially extending element situated adjacent the second end of said shaft and adapted to hold on said shaft the coupling member mounted thereon, a second radially extending element adapted to press against a radially extending surface on said shaft which is arranged to limit movement of said element towards the second end of said shaft, and a securing member mounted in said hollow shaft and having associated therewith manually operable means accessible from the exterior of said body and of said bracket for exerting force to draw said radially extending elements towards each other.

MICHAEL T. MAGUIRE.

REFERENCES CITED

The following references are of record in the file of this patent:

UNITED STATES PATENTS

| Number | Name | Date |
|---|---|---|
| 1,356,860 | Fast | Oct. 26, 1920 |
| 2,258,349 | Bone et al. | Oct. 7, 1941 |

FOREIGN PATENTS

| Number | Country | Date |
|---|---|---|
| 354,667 | Germany | 1922 |